United States Patent [19]
Lieberman

[11] 3,731,203
[45] May 1, 1973

[54] MONITORING CIRCUIT AND SYSTEM FOR DETECTING SIGNALS IN A SIGNAL TRANSMISSION SYSTEM

[75] Inventor: Daniel Lieberman, Seneca Falls, N.Y.

[73] Assignee: GTE Sylvania Incorporated, Seneca Falls, N.Y.

[22] Filed: Sept. 25, 1970

[21] Appl. No.: 75,429

[52] U.S. Cl.........325/363, 179/175.31 R, 179/170 F, 178/69 G, 178/71 T
[51] Int. Cl..........H04b 3/46, H04b 1/60, H041 25/28
[58] Field of Search......................325/363; 340/416, 340/409, 253, 211; 179/175.3, 175.31 R, 170 F; 178/70 R, 71 T, 69 G

[56] References Cited

UNITED STATES PATENTS

| | | | |
|---|---|---|---|
| 2,460,789 | 2/1949 | Thompson | 340/253 |
| 2,706,286 | 4/1955 | Wheeler et al. | 179/175.31 R |
| 3,082,300 | 3/1963 | Partridge | 179/175.31 R |
| 2,876,341 | 3/1959 | Likel | 179/175.31 R |

FOREIGN PATENTS OR APPLICATIONS

| | | | |
|---|---|---|---|
| 1,211,275 | 2/1966 | Germany | 179/175.31 R |

*Primary Examiner*—Robert L. Griffin
*Assistant Examiner*—John C. Martin
*Attorney*—Robert E. Walrath, Norman J. O'Malley and Frederick H. Rinn

[57] ABSTRACT

A monitoring circuit which detects the presence or absence of signals on a signal transmission medium and generates a coded signal when the absence of signals is detected is shown. Also, a system utilizing a plurality of monitoring circuits is disclosed wherein each monitoring circuit generates a unique coded signal when the absence of signals on a cable is detected, and a receiving station determines which monitoring circuit generated the coded signal.

11 Claims, 4 Drawing Figures

INVENTOR.
DANIEL LIEBERMAN
BY
Robert E. Walrath
ATTORNEY

INVENTOR.
DANIEL LIEBERMAN
BY
Robert E. Walrath
ATTORNEY

MONITORING CIRCUIT AND SYSTEM FOR DETECTING SIGNALS IN A SIGNAL TRANSMISSION SYSTEM

BACKGROUND OF THE INVENTION

In signal transmission systems, such as community antenna television (CATV) or cable systems, as well as similar systems, locating the point where signal loss or other faults occur can be a time consuming task. Prior art techniques for locating such points are either slow or complex or both and are usually expensive in workmens' time and equipment. Prior art techniques to automatically determine signal status include the use of sampling circuits which detect the transmitted signal and transmit information concerning signal status on a separate transmission path. Providing a separate transmission path, however, is also expensive. Accordingly, known prior art systems and techniques for detecting signal status or faults in a signal transmission system are either time consuming or expensive or both.

OBJECTS AND SUMMARY OF THE INVENTION

Accordingly, it is an object of this invention to provide a simple and economical technique for detecting the location of faults in a signal transmission system.

It is a further object of this invention to provide circuits and a system for automatically locating faults in a signal transmission system.

In one aspect of this invention the above objects and advantages are achieved in a monitoring circuit for use in a signal transmission system for transmitting signals via a signal transmission medium wherein the monitoring circuit includes detecting means and signal generating means. The detecting means is adapted to be coupled to the signal transmission medium for detecting the presence and absence of signals. When the detecting means detects the absence of transmitted signals, the signal generating means generates a coded signal with a code representative of the monitoring circuit. The signal generating means is adapted to be coupled to the transmission medium for transmitting the coded signal which is capable of causing subsequent monitoring circuits to detect the presence of transmitted signals.

In another aspect of this invention the above objects and advantages are achieved in a signal transmission system for transmitting television signals via a cable including cable segments coupled by amplifiers for maintaining the signal strength of the television signals and a plurality of monitoring circuits spaced along the cable and coupled between segments thereof. Each of the monitoring circuits includes detecting means coupled to a first cable segment and signal generating means coupled to a second cable segment. The detecting means detects the presence and absence of signals on the first cable segment. The signal generating means is connected to the detecting means and generates a coded signal with a code representative of the particular monitoring circuit when the detecting means detects the absence of signals on the first cable segment.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
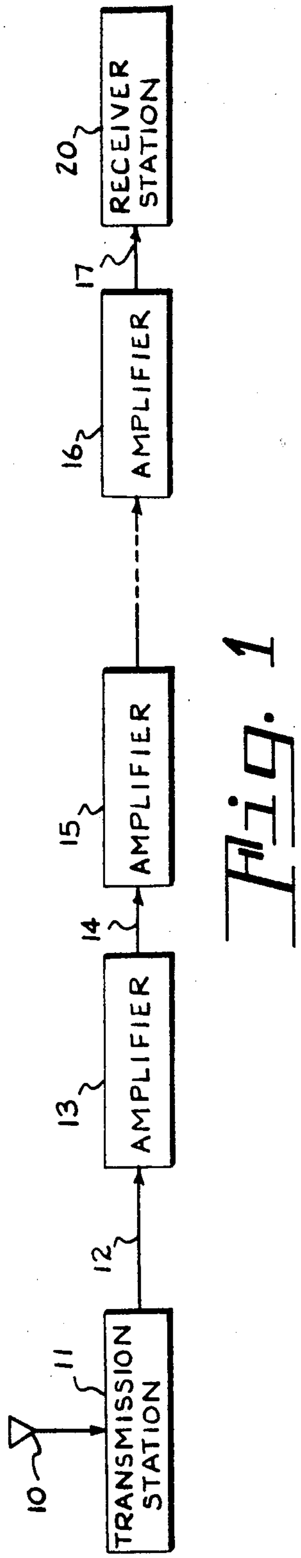
FIG. 1 is a block diagram of a system in which the invention finds utility.

FIG. 1 illustrates a typical block diagram of a signal transmission system for transmitting signals via a signal transmission medium. The invention will be described with reference to a cable television (CATV) transmission system wherein the transmission medium is cable segments coupled by amplifiers for maintaining the signal strength of television signals. An antenna 10 intercepts transmitted television signals which are coupled to a transmission station or head-end 11. Alternatively or additionally signals may be conducted to station 11 by other means such as microwave systems. Station 11 amplifies and adjusts the signals which are then coupled to a first cable segment 12 such as a coaxial cable. An amplifier station 13 receives the signals from cable segment 12, amplifies the signals, and couples the signals to a second cable segment 14. An amplifier station 15 receives the signals from cable segment 14, amplifies the signals, and couples the signals to another cable segment, and so on until an amplifier station 16 receives the signals and couples them to an input 17 of a receiver station 20.

In operation, the signals provided by station 11 are amplified by amplifiers in stations 13, 15, 16, and other amplifiers between amplifier stations 15 and 16 to maintain the signal strength. While each CATV system is tailored to the particular local conditions, a general system includes a transmission line which transmits the signals from the head-end station 11. One or more distribution lines are coupled to the transmission line and conduct the signals to the various subscribers. The signals are tapped off the distribution line at each subscriber location. Throughout the system of transmission and distribution lines amplifiers are used to maintain proper signal strength. Such amplifiers are preferably included an amplifier stations of modular construction wherein various modules can be incorporated into each amplifier station as desired.

Figure 2:
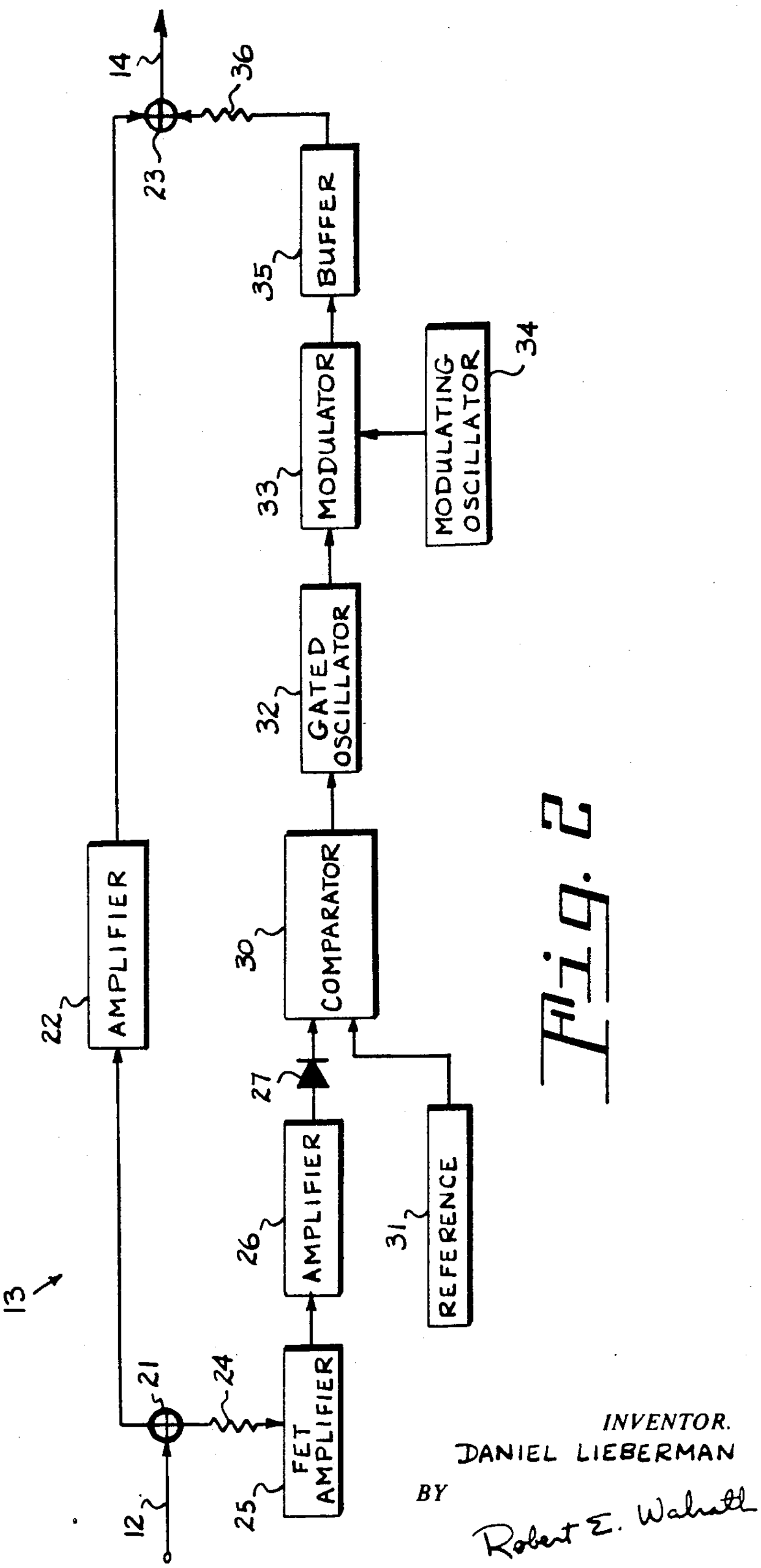
FIG. 2 is a block diagram of an amplifier in combination with an embodiment of a monitoring circuit in accordance with the invention.

FIG. 2 illustrates an amplifier station, such as amplifier station 13, which incorporates one embodiment of a monitoring circuit in accordance with the invention. Cable segment 12 is coupled by a coupling means 21 to an amplifier 22 which amplifies the signals on cable segment 12. An output of amplifier 22 is coupled by a coupling means 23 to cable segment 14. Coupling means 21 is connected by an isolation resistor 24 to a buffer, such as field-effect transistor (FET) amplifier 25. FET amplifier 25 is connected to a discriminating means or amplifier 26 which has an output connected by a rectifying means, illustrated as a diode 27, to a comparing means or comparator 30. A source of reference voltage 31, which can be ground potential, is connected to another input of comparator 30 which has an output connected to a gated oscillator 32. An output of gated oscillator 32 is connected to a modulating means or modulator 33 which also receives a signal from a modulating oscillator 34. An output of modulator 33 is connected by a buffer 35 in series with an isolation resistor 36 to coupling means 23.

Amplifier 26, diode 27, and comparator 30 are a detecting means for detecting the presence or absence of signals on cable segment 12. Gated oscillator 32, modulator 33, and oscillator 34 are a signal generating means. As will be explained below, amplifier 26 can be a tuned amplifier or discriminator means for discriminating between a particular signal and the remaining signals on cable segment 12.

In operation, the television signals on cable segment 12 are coupled through coupling means 21, resistor 24, and amplifier 25 to amplifier 26 which amplifies the signals. Diode 27 rectifies the signals to provide a dc voltage to comparator 30. Comparator 30 compares the dc voltage to a reference voltage provided by source 31 and provides an output indication of the presence or absence of signals on cable segment 12. For this purpose comparator 30 can be any of the conventional voltage comparators such as those available as integrated circuits or, for example, an amplifier and/or a Schmitt trigger. Note that the absence of signals can also include the case where the signals are less than a predetermined amplitude.

If signals are present on cable segment 12, comparator 30 provides an output signal to inhibit gated oscillator 32. Thus, modulator 33 does not provide an output signal. If no signals are present on cable segment 12, comparator 30 provides an output signal to enable gated oscillator 32. Modulator 33 modulates the signal provided by gated oscillator 32 with a code. In the specific embodiment of FIG. 2 the code is a sinusoidal signal of a particular frequency provided by modulating oscillator 34. The coded output signal from modulator 33 is coupled by buffer 35, resistor 36, and coupling means 23 to cable segment 14.

In a CATV system, such as was described above, preferably the monitoring circuits are included as modules in the various amplifier stations. It is not necessary in a system in accordance with this invention, however, for each amplifier station to include a monitoring circuit. Preferably a plurality of monitoring circuits are spaced along the cable so that the loss of signal can be detected and isolated to a specific section of the cable. In FIG. 1, assuming that each amplifier station includes a monitoring circuit, signal loss between amplifier stations 13 and 15 causes the monitoring circuit in amplifier station 16 to transmit a coded signal. Preferably the coded signal is capable of causing each subsequent monitoring circuit to detect the presence of transmitted signal so that only the coded signal generated by the monitoring circuit in amplifier station 15 is transmitted to receiver station 20. The coded signal is coupled through the amplifiers equivalent to amplifier 22 of FIG. 2 contained in each subsequent amplifier station.

In receiver station 20 the coded signal is demodulated and an indication is given, in response to the code, that the monitoring circuit in amplifier station 15 generated the coded signal. Thus, maintenance personnel can be promptly directed to the problem area. The codes can be sinusoidal signals with a different frequency assigned to each monitoring circuit. Thus, the monitoring circuit that generated the alarm can be determined from measuring the frequency of the modulations of the coded signal.

Preferably, the carrier frequency of the coded signal is near or within the band of frequencies that includes the television signals being transmitted. This frequency range is preferred because the signal can be transmitted through ordinary trunk amplifiers, such as amplifier 22 of FIG. 2, and the detecting means in subsequent monitoring circuits can be more easily designed to detect the coded signal.

In some CATV systems one or more pilot signals are included in the transmitted signals. Such pilot signals are used for gain control in the trunk amplifiers. The frequencies of the pilot signals can be, for example, between channels 4 and 5, e.g., 73.5 mHz, and between channels 6 and 7, e.g., 163.5 mHz. Thus, the coded signal can conveniently have a carrier frequency, such as 73.5 mHz, which satisfies the above requirements.

In systems with automatic control which use pilot signals, amplifier 26 of FIG. 2 may be a tuned amplifier with a passband tuned about the frequency of one of the pilot signals such as 73.5 mHz. Thus, the tuned amplifier discriminates between the pilot signal and the remaining transmitted signals and the pilot signal only is rectified by diode 27. Also in such systems, gated oscillator 32 generates a carrier of 73.5 mHz which is modulated in modulator 33.

Figure 3:
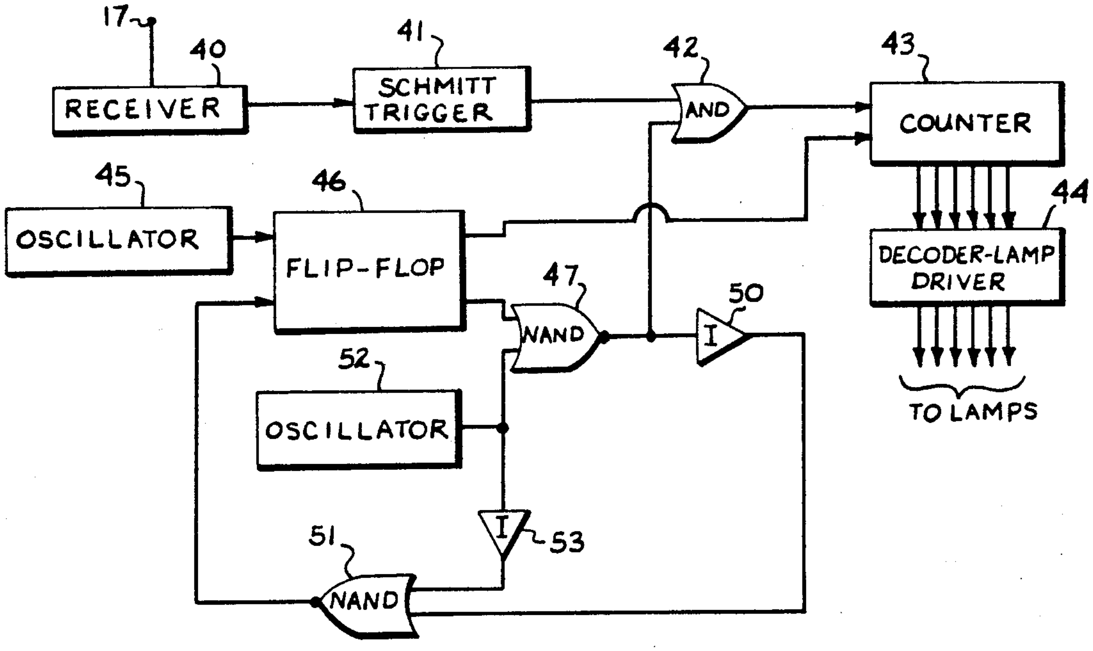
FIG. 3 is a block diagram of a receiver station.

FIG. 3 illustrates one embodiment of a receiver station 20 for detecting the coded signals and determining which monitoring circuit generated the coded signal. Input terminal 17 is connected to a receiver or detector 40 which has an output connected to a squaring circuit such as a Schmitt trigger 41. An output of Schmitt trigger 41 is connected to a first input of an AND gate 42 which has an output connected to an input of a counter 43. Counter 43 can be a binary counter which provides a plurality of outputs to a decoder and/or driver 44 which drives an indicating means such as a set of lamps. The lamps or other indicating means provide an output indication of the count in counter 43 which is in turn dependent upon the frequency of the modulations of the coded signal received at terminal 17.

An oscillator 45 has an output connected to a set input of a bistable circuit or flip-flop 46. A reset output of flip-flop 46 is connected to a reset input of counter 43. Another output of flip-flop 46 is connected to a first input of a NAND gate 47 which has an output connected to a second input of AND gate 42. The output of NAND gate 47 is further connected to an input of an inverter 50 which has an output connected to a first input of a NAND gate 51. NAND gate 51 has an output connected to a reset input of flip-flop 46. An oscillator 52 has an output connected to a second input of NAND gate 47 and to an input of an inverter 53 which has an output connected to a second input of NAND gate 51.

In operation, the amplitude modulated coded signal indicating that one of the monitoring circuits has detected loss of signal is received at terminal 17 and demodulated or detected by receiver 40. The demodulated sine wave code signal is applied to Schmitt trigger 41 which provides a square wave output at the frequency of the code signal. The square wave is applied to AND gate 42.

Figure 4:
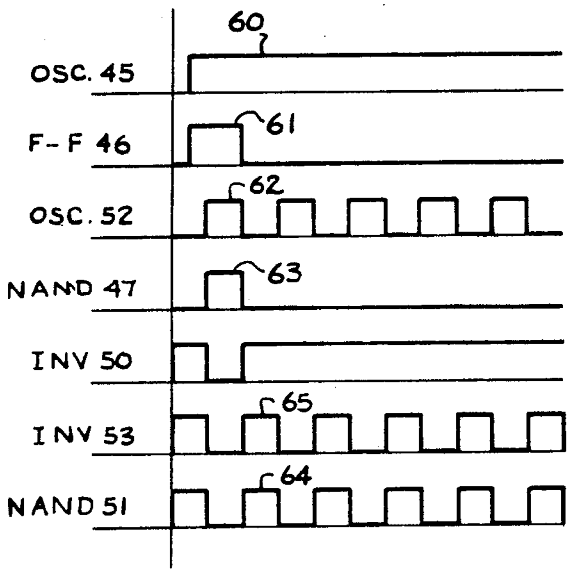
FIG. 4 is a timing diagram to aid in explaining FIG. 3.

Oscillator 45 determines the sampling rate of the receiver station, i.e., how often the receiver station "checks" to determine whether a coded signal is present. Oscillator 52 determines the length of the gate pulse which in turn is used to determine the frequency of the code signal. Assume that flip-flop 46 is initially in a reset state so that the output to NAND gate 47 is a binary "0" and the output from NAND gate 47 to AND gate 42 is a binary "0." Oscillator 45 provides an output pulse 60 illustrated in the timing diagram of FIG. 4. The leading edge of pulse 60 sets flip-flop 46. The output from flip-flop 46 to counter 43 resets counter 43 to zero, while the output to NAND gate 47 is a binary "1" as is shown by pulse 61 of FIG. 4. The next pulse from oscillator 52, pulse 62 of FIG. 4, causes NAND gate 47 to provide a binary "1" output to AND gate 42. The output from NAND gate 47 is represented by gate pulse 63 of FIG. 4. AND gate 42 then reproduces the square wave output from Schmitt trigger 41 and applies the square wave to counter 43. The binary "1" output from NAND gate 47 is inverted by inverter 50 so that one input of NAND gate 51 is a binary "0," and NAND gate 51 provides a binary "0" output to prevent reset of flip-flop 46. When pulse 62 from oscillator 52 ends, NAND gate 47 provides a binary "0" output thereby ending gate pulse 63 and inhibiting AND gate 42. Inverter 50 provides a binary "1" output to NAND gate 51 so that NAND gate 51 provides a binary "1" output, represented by pulse 64, in response to pulse 65 from inverter 53. Pulse 64 resets flip-flop 46 thereby inhibiting NAND gate 47 to prevent any further sampling by AND gate 42 until oscillator 45 provides the next output pulse to set flip-flop 46 again.

Assuming that the lowest frequency sinusoidal code signal is $f$, the frequency of oscillator 52 should be one-half $f$ or lower to assure that counter 43 will receive at least on pulse during a sampling period. Preferably, the codes are selected so that for each code counter 43 will provide a unique count. An an example, assume that the codes are sinusoidal signals of 10 kHz, 20 kHz, 30 kHz, etc. Then, if oscillator 52 is a 5 kHz oscillator, the sampling period will be 0.1 milliseconds. If the 10 kHz code is received, the count in counter 43 will be one; if the 20 kHz code is received, the count in counter 43 will be two; and so on. The counter output is decoded by decoder 44, which also serves as a lamp driver for lighting the appropriate lamps which indicate the location of the fault locating monitoring circuit that generated the code.

The above illustrated and described monitoring circuit and system provides a simple and economical technique for automatically detecting the location of faults in a signal transmission system. Although specific circuits are described and the invention is described with reference to a CATV system, those skilled in the art will realize that the invention is useable in signal transmission systems other than CATV and with circuits other than those illustrated.

While there have been shown and described what are at present considered the preferred embodiments of the invention, it will be obvious to those skilled in the art that various changes and modifications may be made therein without departing from the scope of the invention as defined by the appended claims.

I claim:

1. A monitoring circuit for use in a signal transmission system for transmitting signals via a signal transmission medium comprising:

detecting means adapted to be coupled to said signal transmission medium for detecting the presence and absence of signals transmitted via said signal transmission medium, said detecting means including a rectifying means for rectifying the transmitted signals and a comparing means for comparing the output voltage of said rectifying means with a reference voltage;

a gated oscillator connected to said detecting means for providing an output signal at a carrier frequency when said detecting means detects the absence of the transmitted signals;

modulating means connected to said gated oscillator for modulating said output signal with a sinusoidal code signal of a particular frequency to provide a coded signal representative of the monitoring circuit; and means adapted to couple said modulating means to said signal transmission medium for transmitting said coded signal, said coded signal being capable of causing subsequent monitoring circuits to detect the presence of transmitted signals.

2. A monitoring circuit for use in a signal transmission system as defined in claim 1 wherein said signal transmission medium includes at least two cable segments coupled by an amplifier and the signals transmitted include television signals, said monitoring circuit adapted to be coupled between the two cable segments.

3. A monitoring circuit as defined in claim 1 wherein the transmitted signals include a pilot signal of a particular frequency, said detecting means includes discriminating means for separating said pilot signal from the remaining transmitted signals, said detecting means detects the presence and absence of said pilot signal, and said output signal of said gated oscillator has a frequency of said particular frequency of said pilot signal.

4. A monitoring circuit as defined in claim 3 wherein said discriminating means includes a tuned amplifier with a passband tuned about the frequency of said pilot signal.

5. A monitoring circuit as defined in claim 3 wherein said rectifying means rectifies said pilot signal from said discriminating means.

6. A monitoring circuit as defined in claim 5 wherein said pilot signal is of a frequency within the frequencies of the transmitted signals and said discriminating means include a tuned amplifier with a passband tuned about the frequency of said pilot signal.

7. A signal transmission system for transmitting television signals via a cable including cable segments coupled by amplifiers for maintaining the signal strength of the television signals and a plurality of monitoring circuits spaced along said cable and coupled between segments thereof, each of said monitoring circuits comprising:

input means coupled to a first cable segment;

detecting means connected to said input means for detecting the presence and absence of signals on said first cable segment, said detecting means including a rectifying means for rectifying the signals coupled from said first cable segment and a comparing means for comparing the output voltage of said rectifying means with a reference voltage;

a gated oscillator connected to said detecting means for providing an output signal of a carrier frequency when said detecting means detects the absence of signals on said first cable segment;

modulating means connected to said gated oscillator for modulating said output signal with a code comprising a sinusoidal signal of a particular frequency to provide a coded signal representative of the particular monitoring circuit; and means coupling said modulating means to a second cable segment, said coded signal being capable of causing the detecting means of subsequent monitoring circuits to detect the presence of signals.

8. A signal transmission system as defined in claim 7 wherein the television signals include a pilot signal of a particular frequency, and said detecting means of each monitoring circuit includes discriminating means for separating said pilot signal from the remaining transmitted signals, said detecting means of each monitoring circuit detects the presence and absence of said pilot signal, and said coded signal has a carrier frequency of said particular frequency of said pilot signal.

9. A signal transmission system as defined in claim 8 wherein said discriminating means of each monitoring circuit includes a tuned amplifier with a passband tuned about said particular frequency of said pilot signal.

10. A signal transmission system as defined in claim 8 in combination with a receiver station coupled to one of said cable segments for detecting the code and for providing an output indication of the particular one of the monitoring circuits that generated the code.

11. A signal transmission system as defined in claim 7 in combination with a receiver station connected to one of said cable segments for detecting the code and for providing an output indication of the particular one of the monitoring circuits that generated the code.

* * * * *